Patented Feb. 23, 1954

2,670,268

UNITED STATES PATENT OFFICE 2,670,268

WET SPINNING OF POLYACRYLONITRILE FROM SALT SOLUTIONS

George W. Stanton, Walnut Creek, and Thomas C. Spence, Concord, Calif., assignors to The Dow Chemical Company, Midland, Mich., a corporation of Delaware No Drawing. Application May 28, 1951, Serial No. 228,754

3 Claims. (Cl. 18—54)

This invention relates to a method for improving the quality of polyacrylonitrile and high acrylonitrile copolymer fibers formed by wet spinning aqueous salt solutions of such polymers.

As is pointed out by Merner, in U. S. Patent 2,404,723, aqueous salt solutions of polyacrylonitrile commonly yield poor fibers when wet spun into a coagulant bath. The fibers are brittle, opaque and full of voids. Considerable improvement has been found possible by dissolving the polymer in an aqueous salt solution of from 30 to 50 per cent concentration of a salt which, in more concentrated solution, is a solvent for the polymer and a lesser amount, from 5 to 25 per cent concentration, of a salt which is not a solvent for the polymer, even at high concentrations. The aggregate concentration of both salts is at least 55 per cent. This has been described more fully by the present inventors and another in a concurrently filed application, Serial No. 228,751. Solvent salts are those whose anions are at least as high in the following table as their cations, and nonsolvent salts are those whose anions are lower in the table than their cations.

TABLE

Lyotropic series for polyacrylonitrile

| Cations in Increasing Order of Effectiveness | Anions in Decreasing Order of Effectiveness |
|---|---|
| K+<br>Fe+++<br>Pb++<br>NH4+<br>Cd++<br>Al+++<br>Na+<br>Ba++<br>Ca++<br>Li+<br>Mg++<br>Ga+++<br>Sb+++<br>In+++<br>Tl+++<br>Sn++++<br>Zn++<br>Ag+<br>Ni++<br>Co++<br>Mn++ | SCN−<br><br>I−<br><br>Br−<br><br>Cl−<br><br>NO3−<br><br>SO4= |

It has now been found that satisfactory fibers may be spun from aqueous salt solutions of polyacrylonitrile or of high acrylonitrile copolymers containing a single salt, as in the prior art, or mixed solvent and non-solvent salts as in the said concurrently filed application, when there is dissolved in at least one of the aqueous coagulating baths through which the fiber passes in the course of its production, an organic peptizing agent for the polymer at a concentration insufficient to dissolve the polymer. Numerous such agents are known, and many of them are listed in U. S. Patents 2,404,713–2,404,728, inclusive. By way of illustration and not of limitation, examples of typical peptizing agents useful in the invention are dimethylformamide, acetonitrile, succinonitrile, nitromethane, nitroethane, p-toluene sulfonamide, dimethyl sulfone, tetramethylene cyclic sulfone and dichloroformal. Those peptizing agents which are less soluble in water than is desired to effect the treatment of the present invention are commonly dissolved in a water miscible solvent, such as acetone or methyl or ethyl alcohol, and that solution is dissolved in water to be used in conditioning the polymeric fibers.

In the normal course of a wet spinning operation carried out on aqueous salt solutions of the polymers, the solution is forced through a spinneret into water or a dilute acid or saline bath while being stretched. It may thereafter be passed through one or more additional coagulant baths with or without intervening stretching operations and with or without the application of heat. The various baths effect a substantially complete leaching of the original salt from the fiber. It is in any of these baths that the presence of the potential peptizing agent is found advantageous. The concentration of peptizing agent in the aqueous coagulant bath should be insufficient to dissolve or materially weaken the fiber passing through the bath, or to affect the product adversely in the balance of the fiber spinning process, and, while such concentration differs somewhat for each such agent, it has been found that concentrations of from 5 to 30 per cent (within the limits of solubility of the agent in the aqueous medium) are generally quite satisfactory, even for prolonged contact with the fiber, and that much more concentrated solutions may be used when the contact time is kept brief. When the peptizing agent is in the initial coagulating bath, adjacent the spinneret, somewhat higher concentrations thereof may be present without weakening the fiber in a given contact time than when it is introduced in a later bath in the series, since much more salt will be extracted from the fresh fiber than the amount of peptizing agent absorbed thereby, while later the fiber has less salt and is more receptive to the peptizing agent. The treatment should be of a duration to introduce at least 2 per cent peptizing agent into the fibers, based on the weight of the fibers.

The result of employing the organic peptizing agent in aqueous coagulating baths during the spinning of fibers from salt solutions of polymers rich in acrylonitrile is the formation of fibers which are clear and free from voids, thus having higher tenacity values than the brittle fibers heretofore obtainable from such salt solutions. The presence of the peptizing agent in the initial coagulating bath often makes possible a considerably greater stretching of the fiber and diminution of its denier than when water alone is used as the coagulant.

The following example illustrates the practice of the invention.

A solution of polyacrylonitrile in an aqueous mixed brine, consisting of about twice as much zinc chloride as calcium chloride, and about 60 per cent of both, was extruded through spinneret orifices 0.003 inch in diameter into an initial coagulating bath consisting of an aqueous solution of the same salts at about 0.4 their concentration in the spinning solution. The so-coagulated filaments were washed with water to reduce their salt content, and were stretched in wet steam to 7.5 times their length per unit weight when first extruded. They were washed with more water to effect further coagulation and reduce the amount of remaining salt. A portion of the filaments was taken directly to an oven at 125° C., where the product was dried under restraint. A 5 per cent shrinkage occurred during drying. Another portion of the filaments was taken from the second water bath into an aqueous solution of 75 per cent dimethyl formamide, and 25 per cent water. After a brief contact time of about 3 seconds, the filaments were removed from this bath and were dried in the oven at 125° C. under restraint. A 7 per cent stretch was obtained during drying. The product which had received no treatment with a peptizing agent had a denier of 1.25, a tenacity of 1.64 grams per denier, and was capable of 24.1 per cent elongation, while that which had received its final coagulation in the solution of peptizing agent had a denier of 0.88, a tenacity of 3.2 grams per denier, and was capable of 27.5 per cent elongation.

When the bath containing dimethyl formamide of the foregoing example was replaced by baths containing other peptizing agents, fibers having a denier of 1 to 1.5 had tenacities of 2.96 to 4.90 or more grams per denier. The agents used in these runs included 2(N-hydroxyethyl N-methyl formamide), unsymmetrical diethylurea, 2-nitropropane, nitroethane and nitromethane (50 per cent in ethanol and 50 per cent in acetone), cyclohexanone, and 1,4-dioxane, and others of the agents named earlier herein.

Similar advantages have been noted when the peptizing agent is used in any of the baths through which the spun product passes during its production. The peptizing agent may be any organic compound capable of swelling or dissolving the polymer, but is used in solution at a concentration which cannot dissolve or materially soften the polymer during the period in which the spun product is in such solution.

We claim:

1. In the wet spinning of aqueous salt solutions of polymers rich in acrylonitrile, the improvement which consists in employing, in one of the baths through which the spun product passes during its production, an aqueous solution of an organic peptizing agent for the polymer at a concentration of at least 5 per cent but insufficient to weaken the spun product, and passing the product through said bath at a rate to absorb at least 2 per cent of peptizing agent in the product, based on the weight of the product.

2. The method as claimed in claim 1, wherein the peptizing agent is dimethylformamide.

3. The method as claimed in claim 1, wherein the peptizing agent is present in the coagulating bath into which the product is spun.

GEORGE W. STANTON.
THOMAS C. SPENCE.

References Cited in the file of this patent

UNITED STATES PATENTS

| Number | Name | Date |
| --- | --- | --- |
| 2,140,921 | Rein | Dec. 20, 1938 |
| 2,515,206 | Finzel et al. | July 18, 1950 |
| 2,577,763 | Hoxie | Dec. 11, 1951 |